US012704079B2

(12) United States Patent
Gupta et al.

(10) Patent No.: US 12,704,079 B2
(45) Date of Patent: Aug. 11, 2026

(54) TURBINE HOUSING AND VARIABLE GEOMETRY TURBOCHARGER

(71) Applicant: MITSUBISHI HEAVY INDUSTRIES, LTD., Tokyo (JP)

(72) Inventors: Bipin Gupta, Tokyo (JP); Nao Taniguchi, Tokyo (JP); Yuya Nakahara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 301 days.

(21) Appl. No.: 18/703,984

(22) PCT Filed: Feb. 21, 2023

(86) PCT No.: PCT/JP2023/006154
§ 371 (c)(1),
(2) Date: Apr. 23, 2024

(87) PCT Pub. No.: WO2023/203855
PCT Pub. Date: Oct. 26, 2023

(65) Prior Publication Data
US 2026/0160185 A1 Jun. 11, 2026

(30) Foreign Application Priority Data
Apr. 22, 2022 (JP) ................................ 2022-070779

(51) Int. Cl.
*F02B 37/22* (2006.01)
*F01D 17/16* (2006.01)
*F01D 25/24* (2006.01)

(52) U.S. Cl.
CPC ............ *F01D 25/24* (2013.01); *F01D 17/16* (2013.01); *F02B 37/22* (2013.01)

(58) Field of Classification Search
CPC ........ F02B 37/22; F02B 37/225; F02B 37/24; F01D 9/06; F01D 17/16; F01D 17/165; F01D 25/24; F04D 29/441
See application file for complete search history.

(56) References Cited

U.S. PATENT DOCUMENTS 4,822,242 A * 4/1989 Yamazaki ................ F01D 9/06 415/205
10,519,967 B2 * 12/2019 Tashiro .................. F02B 37/24
(Continued)

FOREIGN PATENT DOCUMENTS

JP 11-229815 A 8/1999
JP 2007-92557 A 4/2007
(Continued)

OTHER PUBLICATIONS

International Preliminary Report on Patentability and Written Opinion of the International Searching Authority for International Application No. PCT/JP2023/006154, dated Oct. 31, 2024, with an English translation.
(Continued)

*Primary Examiner* — Sang K Kim
(74) *Attorney, Agent, or Firm* — Birch, Stewart, Kolasch & Birch, LLP

(57) ABSTRACT

A turbine housing has a scroll passage wall surface connecting an outer peripheral end of a scroll passage and an outer peripheral end of a hub-side passage wall surface. In a cross-section along the axis of a turbine rotor passing through a tongue portion. the scroll passage wall surface includes: a first arc portion extending from an outer peripheral end connected to the outer peripheral end of the scroll passage inward in a radial direction of the turbine rotor; and a cliff portion connecting an inner peripheral end of the first arc portion and the outer peripheral end of the hub-side passage wall surface. The cliff portion includes a second arc
(Continued)

portion connected to the inner peripheral end of the first arc portion and forming an inflection point between the first arc portion and the second arc portion. The inflection point is located offset frontward from the outer peripheral end of the hub-side passage wall surface in an axial direction of the turbine rotor and outward from the outer peripheral end of the hub-side passage wall surface in the radial direction.

11 Claims, 12 Drawing Sheets

(56) References Cited

U.S. PATENT DOCUMENTS

| | | | | |
|---|---|---|---|---|
| 10,890,109 | B2 * | 1/2021 | Yoshida | F01D 17/165 |
| 11,506,114 | B2 * | 11/2022 | Sakamoto | F02C 6/12 |
| 11,808,173 | B2 * | 11/2023 | Hoshi | F02B 37/00 |
| 2020/0232383 | A1 | 7/2020 | Sakamoto et al. | |
| 2021/0270182 | A1 | 9/2021 | Sakamoto et al. | |

FOREIGN PATENT DOCUMENTS

| | | | |
|---|---|---|---|
| JP | 2010-151108 | A | 7/2010 |
| JP | 2013-130136 | A | 7/2013 |
| JP | 2016-205141 | A | 12/2016 |
| WO | WO 2017/168523 | A1 | 10/2017 |

OTHER PUBLICATIONS

International Search Report and Written Opinion of the International Searching Authority for International Application No. PCT/JP2023/006154, dated May 9, 2023.

* cited by examiner

TURBINE HOUSING AND VARIABLE GEOMETRY TURBOCHARGER

TECHNICAL FIELD

The present disclosure relates to a turbine housing and a variable geometry turbocharger including the turbine housing.

The present application claims priority based on Japanese Patent Application No. 2022-070779 filed on Apr. 22, 2022, the entire content of which is incorporated herein by reference.

BACKGROUND ART

A variable geometry turbocharger with a variable geometry turbine is known as a turbocharger for supercharging intake air of an engine (internal combustion engine) by using energy of exhaust gas discharged from the engine (see Patent Document 1, for example). The variable geometry turbine includes a plurality of nozzle vanes arranged in the circumferential direction in an exhaust gas passage (nozzle passage) that leads from the scroll passage of the turbine to the turbine rotor, and the flow-path cross-sectional area of the exhaust gas passage (flow passage between adjacent nozzle vanes) can be adjusted by changing the blade angle of these nozzle vanes with an external actuator. By adjusting the flow-path cross-sectional area of the exhaust gas passage, the variable geometry turbine can change the flow velocity and the pressure of exhaust gas introduced into the turbine rotor to enhance the supercharging effect.

CITATION LIST

Patent Literature

Patent Document 1: JPH11-229815A

SUMMARY

Problems to be Solved

The load applied to the nozzle vanes (fluid force from exhaust gas) changes as the pressure ratio of exhaust gas introduced into the variable geometry turbine changes with the pulsation of the engine. The load acting on the nozzle vane may reduce the clearance between a vane shaft fixed to the nozzle vane and another part supporting the nozzle vane and bring them into contact. Frequent contact between the vane shaft and the other part during operation of the variable geometry turbine may cause wear of the vane shaft, resulting in damage.

If the direction of action of the load on the vane shaft is reversed in a short period of time, about one cycle of pulsation of the engine, the contact occurs frequently and there is a high risk of wear of the vane shaft, leading to a reduction in reliability of the nozzle vane, so it is necessary to take measures. In particular, the nozzle vane disposed near the tongue portion of the scroll passage may reverse the direction of action of the load on the vane shaft in a short period of about one cycle of pulsation of the engine due to swirl flow of exhaust gas and wake (flow distortion) that occurs at the tongue portion with exhaust gas flow. Patent Document 1 does not focus on the issue of suppressing the wear of the vane shaft caused by pulsation of the internal combustion engine and improving the reliability of the nozzle vane.

In view of the above, an object of at least one embodiment of the present invention is to provide a turbine housing and a variable geometry turbocharger including the turbine housing that can improve the reliability of the nozzle vane.

Solution to the Problems

A turbine housing according to at least one embodiment of the invention is a turbine housing for accommodating a turbine rotor and includes: a scroll passage forming part which forms a scroll passage extending along a circumferential direction around an axis of the turbine rotor; a nozzle passage forming part which forms a nozzle passage for directing exhaust gas from the scroll passage to the turbine rotor disposed on an inner peripheral side of the scroll passage, the nozzle passage forming part having a shroud-side passage wall surface and a hub-side passage wall surface which define the nozzle passage; and a variable nozzle unit for adjusting a flow of the exhaust gas in the nozzle passage, the variable nozzle unit including at least one nozzle vane disposed in the nozzle passage. The scroll passage forming part includes a scroll passage wall surface connecting an outer peripheral end of the scroll passage and an outer peripheral end of the hub-side passage wall surface. In a cross-section along the axis passing through a tongue portion of the scroll passage forming part, the scroll passage wall surface includes: a first arc portion connected at an outer peripheral end to the outer peripheral end of the scroll passage and extending from the outer peripheral end inward in a radial direction of the turbine rotor; and a cliff portion connected at one end to an inner peripheral end of the first arc portion and connected at another end to the outer peripheral end of the hub-side passage wall surface, the cliff portion including a second arc portion connected to the inner peripheral end of the first arc portion and forming an inflection point between the first are portion and the second arc portion. The inflection point is located offset frontward from the outer peripheral end of the hub-side passage wall surface in an axial direction of the turbine rotor and outward from the outer peripheral end of the hub-side passage wall surface in the radial direction.

A variable geometry turbocharger according to at least one embodiment of the present invention includes: the turbine housing; and a turbine rotor rotatably accommodated in the turbine housing.

Advantageous Effects

At least one embodiment of the present invention provides a turbine housing and a variable geometry turbocharger including the turbine housing that can improve the reliability of the nozzle vane.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Figure 1:
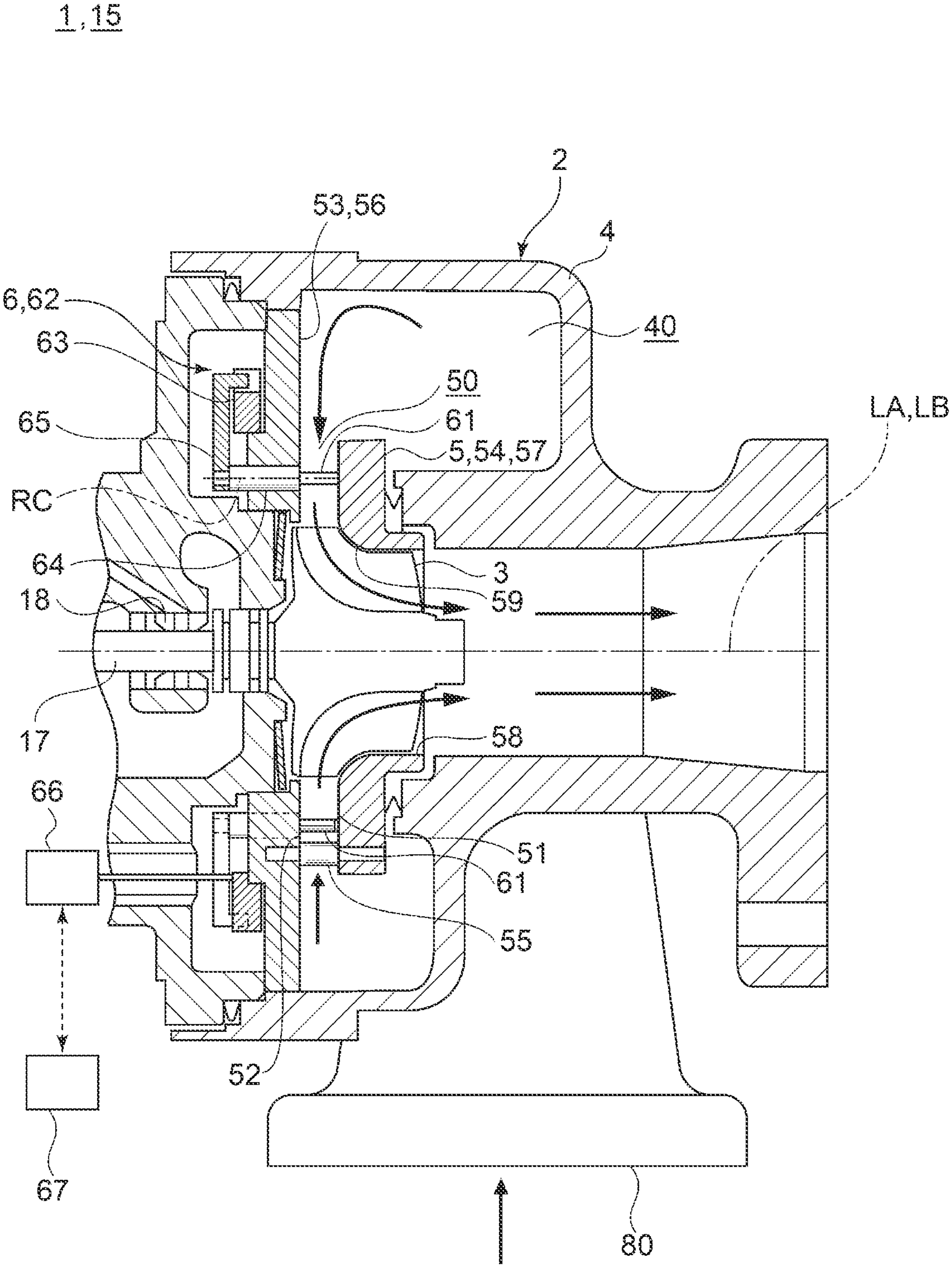
FIG. 1 is a schematic cross-sectional view of a variable geometry turbocharger according to an embodiment, taken along the axis of the turbocharger.
Figure 2:
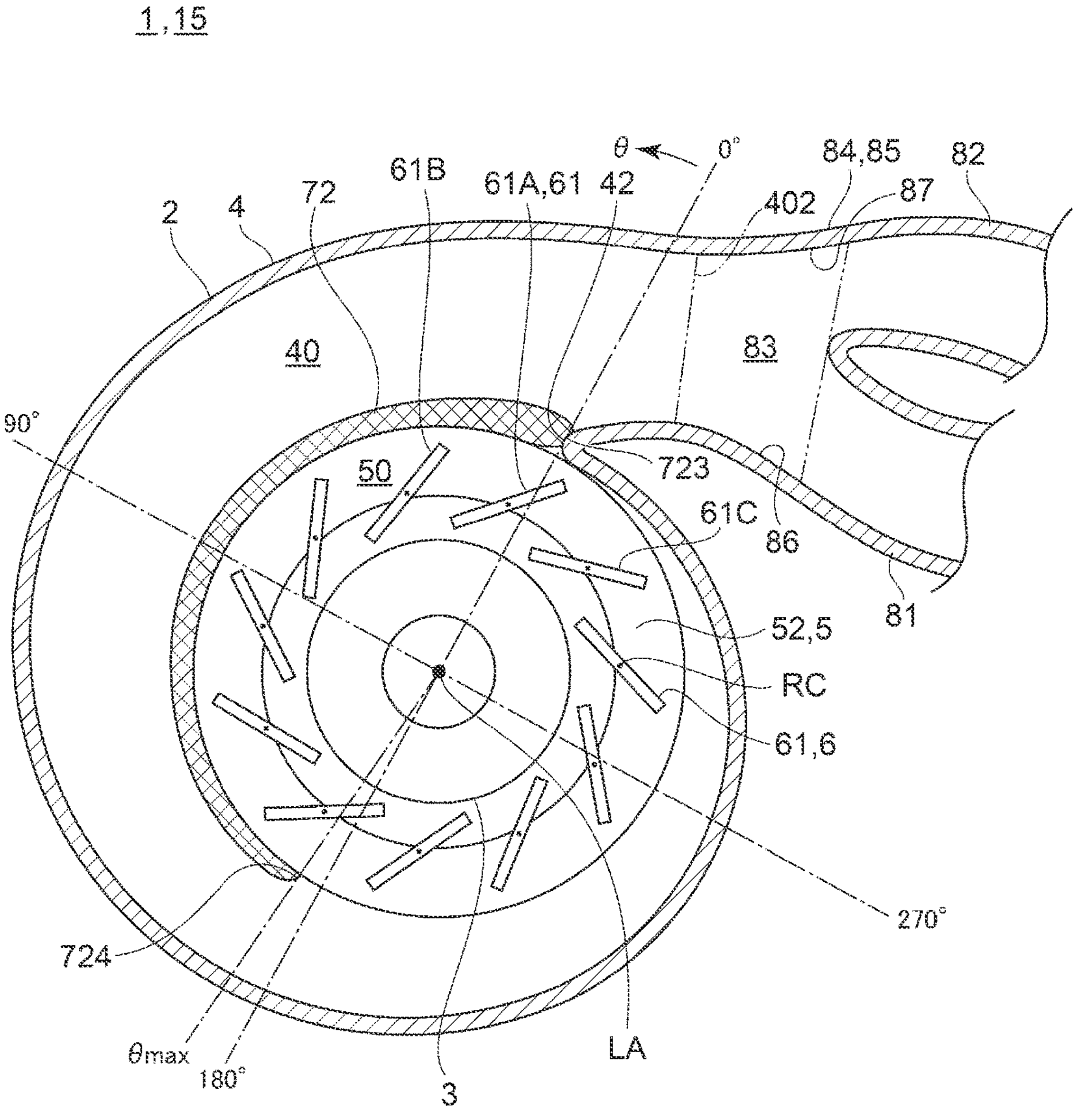
FIG. 2 is a schematic cross-sectional view of the variable geometry turbocharger according to an embodiment, taken perpendicular to the axis.

FIG. 1 is a schematic cross-sectional view of a variable geometry turbocharger 1 according to an embodiment, taken along the axis LA of the turbocharger 1. FIG. 2 is a schematic cross-sectional view of the variable geometry turbocharger 1 according to an embodiment, taken perpendicular to the axis LA. The variable geometry turbocharger 1 according to some embodiments includes, as shown in FIGS. 1 and 2, a turbine housing 2, and a turbine rotor 3 rotatably accommodated in the turbine housing 2.

Hereinafter, the extension direction of the axis LA of the turbine rotor 3 is defined as the axial direction of the turbine rotor 3. In the axial direction, the side where the blade surface of the turbine rotor 3 is located relative to the back surface is defined as the front side, and the side opposite the front side, where the back surface of the turbine rotor 3 is located relative to the blade surface, as the rear side. Also, the direction perpendicular to the axis LA of the turbine rotor 3 is defined as the radial direction. In the radial direction, the outer side in the radial direction is defined as the outer peripheral side, and the inner side in the radial direction as the inner peripheral side.

(Turbine Housing)

As shown in FIGS. 1 and 2, the turbine housing 2 includes a scroll passage forming part 4 which forms a scroll passage 40, a nozzle passage forming part 5 which forms a nozzle passage 50, and a variable nozzle unit 6 for adjusting the flow of exhaust gas in the nozzle passage 50. Each of the scroll passage 40 and the nozzle passage 50 is formed inside the turbine housing 2.

(Scroll Passage)

The scroll passage 40 is a spiral flow passage for directing exhaust gas introduced from the outside of the turbine housing 2 to the turbine rotor 3. The scroll passage 40 extends along the circumferential direction around the axis LA of the turbine rotor 3 on the outer peripheral side of the turbine rotor 3.

(Nozzle Passage)

The nozzle passage 50 is a passage for directing exhaust gas from the scroll passage 40 to the turbine rotor 3 disposed on the inner peripheral side of the scroll passage 40. The nozzle passage 50 is formed between the scroll passage 40 and the turbine rotor 3 so as to surround the outer periphery of the turbine rotor 3. The exhaust gas introduced into the turbine housing 2 passes through the scroll passage 40 and then through the nozzle passage 50, and is led to the turbine rotor 3 from the outer peripheral side of the turbine rotor 3.

The nozzle passage forming part 5 has a shroud-side passage wall surface 51 and a hub-side passage wall surface 52 which define the nozzle passage 50. In a cross-section along the axis LA as shown in FIG. 1, each of the shroud-side passage wall surface 51 and the hub-side passage wall surface 52 extends along a direction intersecting (e.g., perpendicular to) the axis LA. The shroud-side passage wall surface 51 is disposed on the front side of the hub-side passage wall surface 52 in the axial direction, and the shroud-side passage wall surface 51 and the hub-side passage wall surface 52 face each other across the nozzle passage 50.

(Nozzle Passage Forming Part)

In the embodiment shown in FIG. 1, the nozzle passage forming part 5 includes a nozzle mount 53 and a nozzle plate 54 disposed on the front side of the nozzle mount 53 in the axial direction. The nozzle passage forming part 5 may further include at least one (in the illustrated example, more than one) nozzle support 55 which supports the nozzle mount 53 and the nozzle plate 54 at a distance from each other. Each of the nozzle mount 53, the nozzle plate 54, and the plurality of nozzle supports 55 is disposed inside the turbine housing 2 and fixed to the turbine housing 2.

The nozzle mount 53 includes a first annular plate portion 56 extending along the circumferential direction of the turbine rotor 3 on the outer peripheral side of the turbine rotor 3. The nozzle mount 53 has a hub-side passage wall surface 52 formed on the front side of the first annular plate portion 56 in the axial direction.

The nozzle plate 54 includes a second annular plate portion 57 extending along the circumferential direction of the turbine rotor 3 on the outer peripheral side of the turbine rotor 3 and front side of the first annular plate portion 56 in the axial direction. The nozzle plate 54 has the shroud-side passage wall surface 51 formed on the rear side of the second annular plate portion 57 in the axial direction.

As shown in FIG. 1, the nozzle plate 54 may further include a cylindrical portion 58 protruding from the inner peripheral edge of the second annular plate portion 57 along the axial direction frontward in the axial direction. The nozzle plate 54 has a shroud surface 59 connected to the shroud-side passage wall surface 51 and curved convexly. The shroud surface 59 is formed on the inner peripheral edge of the second annular plate portion 57, and a gap (clearance) is formed between the shroud surface 59 and the blade tip of the turbine rotor 3.

The plurality of nozzle supports 55 are arranged at intervals along the circumferential direction of the turbine rotor 3. Each of the nozzle supports 55 is fixed at one end to the first annular plate portion 56 and fixed at the other end to the second annular plate portion 57. The nozzle plate 54 is supported by the plurality of nozzle supports 55 at a distance from the nozzle mount 53 in the axial direction.

(Turbine Rotor)

The turbine rotor 3 is configured to direct exhaust gas introduced from the outer peripheral side of the turbine rotor 3 (outer side in the radial direction) through the nozzle passage 50 to the front side in the axial direction.

(Variable Nozzle Unit)

The variable nozzle unit 6 is configured to adjust the flow of exhaust gas in the nozzle passage 50. The variable nozzle unit 6 includes at least one (in the illustrated example, more than one) nozzle vane 61 disposed in the nozzle passage 50. As shown in FIG. 2, the plurality of nozzle vanes 61 are arranged in the nozzle passage 50 at intervals along the circumferential direction of the turbine rotor 3.

As shown in FIG. 1, the variable nozzle unit 6 further includes a rotation mechanism part 62 configured to interlock and rotate the plurality of nozzle vanes 61 about their respective rotation centers RC. The variable nozzle unit 6 can increase or decrease the flow-path cross-sectional area of the exhaust gas passage formed between the nozzle vanes 61 by changing the blade angle of the plurality of nozzle vanes 61 by the rotation mechanism part 62. The turbine housing 2 can change the flow velocity, pressure, and inflow angle of exhaust gas directed to the turbine rotor 3 by increasing or decreasing the flow-path cross-sectional area of the exhaust gas passage formed between the nozzle vanes 61 by the variable nozzle unit 6.

In the embodiment shown in FIG. 1, the rotation mechanism part 62 includes an annular drive ring 63 disposed rotatably along the circumferential direction of the turbine rotor 3 with respect to the nozzle mount 53, a plurality of vane shafts 64, a plurality of lever plates 65, an actuator 66 configured to rotate the drive ring 63 about the axis LB of the drive ring 63, and a controller (control device) 67 configured to control the driving of the actuator 66.

The rotation mechanism part 62 includes the same number of vane shafts 64 and lever plates 65 as the nozzle vanes 61 included in the variable nozzle unit 6. Each of the vane shafts 64 is fixed at one end to each different (corresponding) nozzle vane 61 and mechanically connected at the other and to one end of each different (corresponding) lever plate 65. The other end of each of the lever plates 65 is mechanically connected to the drive ring 63. The actuator 66 includes an electric motor, an air cylinder, or the like. The actuator 66 is mechanically connected to the drive ring 63.

In the power transmission path from the actuator 66 to the plurality of nozzle vanes 61, the actuator 66 and the drive ring 63, the drive ring 63 and each lever plate 65, and each lever plate 65 and each vane shaft 64, are connected to each other. When the actuator 66 is driven by the controller 67, the drive ring 63 is rotated about the axis LB as the actuator 66 is driven. When the drive ring 63 is rotated, the nozzle vanes 61 are rotated about the respective rotation centers RC via the respective lever plates 65 and vane shafts 64 in conjunction with the rotation of the drive ring 63 to change their blade angle.

When the drive ring 63 is rotated to one side in the circumferential direction, the circumferentially adjacent nozzle vanes 61 move in the direction away from each other, and the flow-path cross-sectional area of the exhaust gas passage between the nozzle vanes 61 increases. When the drive ring 63 is rotated to the other side in the circumferential direction, the circumferentially adjacent nozzle vanes 61 move in the direction toward each other, and the flow-path cross-sectional area of the exhaust gas passage between the nozzle vanes 61 decreases.

(Internal Combustion Engine System, Turbocharger)

Figure 3:
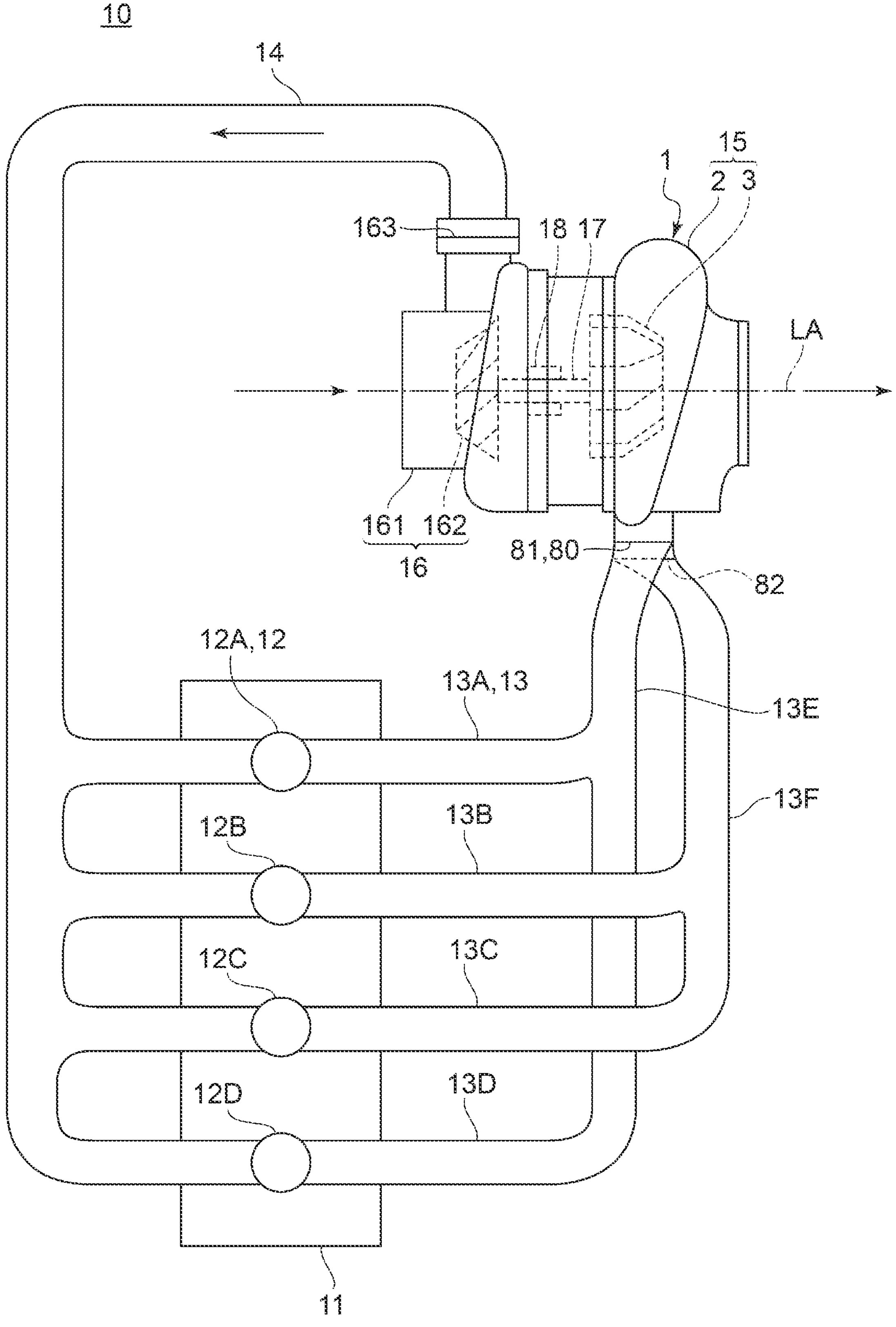
FIG. 3 is a schematic diagram of an internal combustion engine system equipped with a variable geometry turbocharger according to an embodiment.

FIG. 3 is a schematic diagram of an internal combustion engine system 10 equipped with a variable geometry turbocharger 1 according to an embodiment. As shown in FIG. 3, the internal combustion engine system 10 includes a turbocharger 1, an engine (internal combustion engine) 11 having a plurality of cylinders 12 (four cylinders 12A, 12B, 12C, 12D in the illustrated example), an exhaust gas line 13 (13A, 13B, 13C, 13D) for directing exhaust gas discharged from the plurality of cylinders 12 of the turbocharger 1 to the turbocharger 1, and a gas line 14 for directing a gas (e.g., air) compressed in the turbocharger 1 to the plurality of cylinders 12 of the engine 11.

The turbocharger 1 includes a turbine 15 configured to be driven by energy of exhaust gas discharged from the engine 11, as shown in FIG. 1, and a centrifugal compressor 16 configured to be driven with the driving of the turbine 15 and compress a gas (e.g., air) to be supplied to the engine 11. The turbine 15 includes the above-described turbine housing 2 and turbine rotor 3. The centrifugal compressor 16 includes a compressor housing 161 and an impeller 162 rotatably accommodated in the compressor housing 161.

As shown in FIG. 3, the turbocharger 1 includes a turbine housing 2, a turbine rotor 3, a compressor housing 161, an impeller 162, a rotational shaft 17 with the turbine rotor 3 at one end and the impeller 162 at the other end, and a bearing 18 disposed between the turbine rotor 3 and the impeller 162 and configured to rotatably support the rotational shaft 17. The impeller 162 is configured to direct a gas introduced along the axial direction to the outer side in the radial direction of the impeller 162.

The compressor housing 161 has a gas discharge port 163 for discharging the gas having passed through the impeller 162 to the outside. The gas line 14 is connected at the upstream end (one end) to the gas discharge port 163 and connected at multiple branched downstream ends (other ends) to different (corresponding) cylinders 12 (12A, 12B, 12C. 12D). The gas introduced into the compressor housing 161 and compressed in the impeller 162 is supplied to each cylinder 12 of the engine 11 through the gas line 14 and is used for combustion in each cylinder 12.

The turbine housing 2 has at least one exhaust gas introduction port (gas introduction port) 80 for introducing exhaust gas to the inside of the turbine housing 2. The exhaust gas line 13 (13A, 13B, 13C, 13D) is connected at the upstream end (one end) to each different (corresponding) cylinder 12 (12A, 12B, 12C, 12D) and connected at the downstream end (other end) to the at least one exhaust gas introduction port 80.

In the embodiment shown in FIG. 3, the at least one exhaust gas introduction port 80 includes a first exhaust gas introduction port (gas introduction port) 81 and a second exhaust gas introduction port (gas introduction port) 82. The exhaust gas line 13 includes a first confluence line 13E where the exhaust gas line 13A connected at the upstream end to the cylinder 12A and the exhaust gas line 13D connected at the upstream end to the cylinder 12D join. In other words, the exhaust gas line 13A shares the first confluence line 13E with the exhaust gas line 13D. The downstream end of the first confluence line 13E is connected to the first exhaust gas introduction port 81.

The exhaust gas line 13 includes a second confluence line 13F where the exhaust gas line 13B connected at the upstream end to the cylinder 12B and the exhaust gas line 13C connected at the upstream end to the cylinder 12C join. In other words, the exhaust gas line 13B shares the second confluence line 13F with the exhaust gas line 13C. The downstream end of the second confluence line 13F is connected to the second exhaust gas introduction port 82. The exhaust gas from the cylinders 12A and 12D is directed into the turbine housing 2 through the first exhaust gas introduction port 81. The exhaust gas from the cylinders 12B and 12C is directed into the turbine housing 2 through the second exhaust gas introduction port 82. The exhaust gas introduced into the turbine housing 2 passes through the scroll passage 40 and the nozzle passage 50 and is then directed to the turbine rotor 3.

The turbine 15 of the turbocharger 1 is configured to rotate the turbine rotor 3 by energy of exhaust gas from the engine 11. Since the impeller 162 is mechanically connected to the turbine rotor 3 via the rotational shaft 17, the impeller 162 rotates in conjunction with the rotation of the turbine rotor 3. The centrifugal compressor 16 of the turbocharger 1 is configured to compress the gas passing through the impeller 162 with the rotation of the impeller 162 to increase the density of the gas, and supply it to the engine 11.

(Scroll Passage Forming Part)

The scroll passage forming part 4 has a tongue portion 42 that protrudes toward the scroll passage 40 and separates the winding start and the winding end of the scroll passage 40 in a cross-section perpendicular to the axis LA of the turbine rotor 3, as shown in FIG. 2. As shown in FIG. 2, the angular position θ is defined such that, with the angular position of the tongue portion 42 in the circumferential direction around the axis LA of the turbine housing 2 being 0°, the angle gradually increases from the tongue portion 42 toward the downstream side of the scroll passage 40.

(Near-Tongue Nozzle Vane)

In a cross-section perpendicular to the axis LA of the turbine rotor 3, as shown in FIG. 2, the nozzle vane 61A closest to the tongue portion 42 and the two nozzle vanes 61B, 61C adjacent to the nozzle vane 61A in the circumferential direction of the turbine rotor 3 are defined as near-tongue nozzle vanes.

(Turbine Housing According to Comparative Example)

Figure 4:
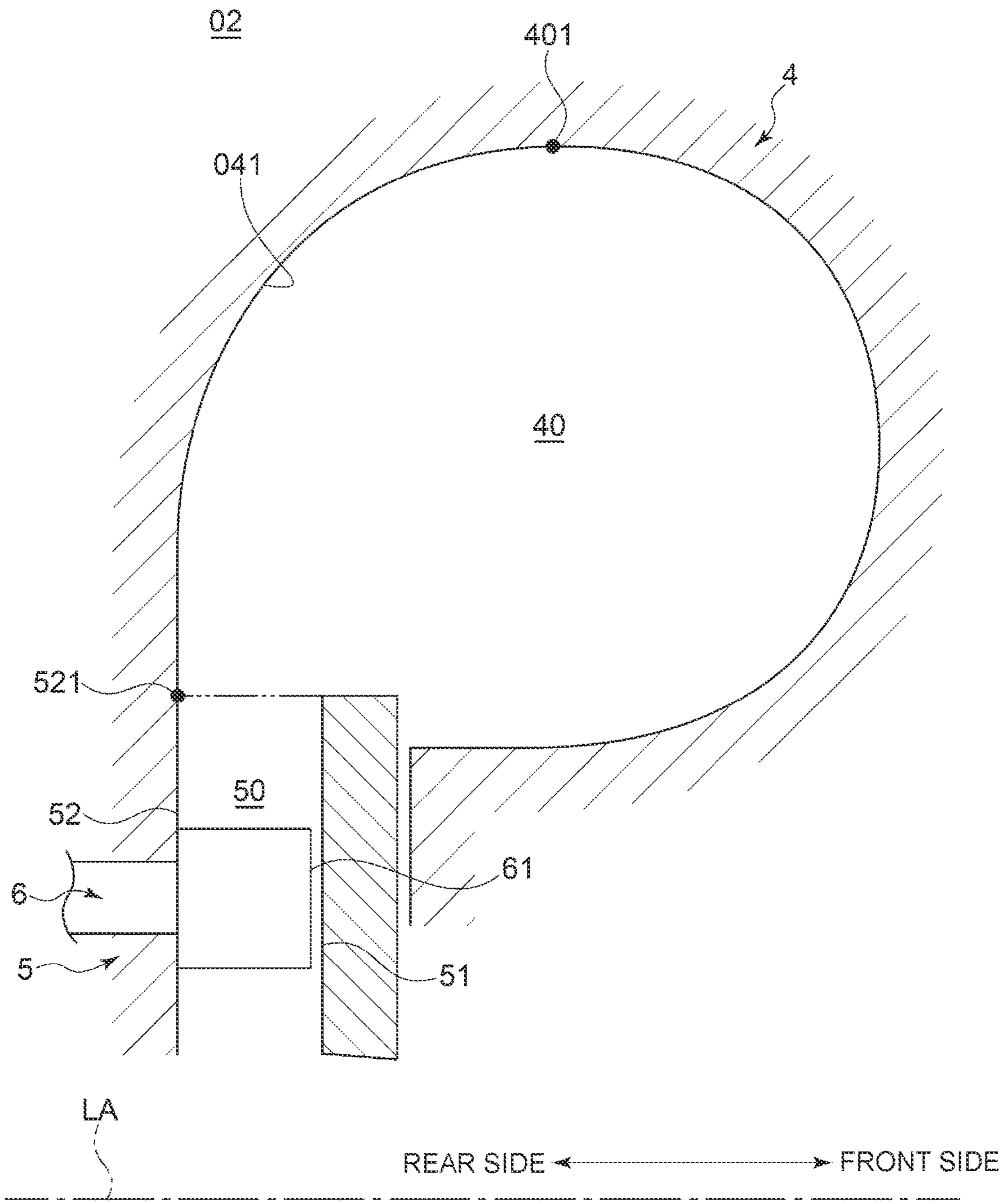
FIG. 4 is a schematic cross-sectional view of a turbine housing according to a comparative example, taken along the axis passing through the tongue portion.

FIG. 4 is a schematic cross-sectional view of a turbine housing 02 according to a comparative example, taken along the axis LA passing through the tongue portion 42 (see FIG. 3). FIG. 4 schematically shows the cross-section of the turbine housing 02 in the angular position θ of 0°. In the turbine housing 02 according to the comparative example, the same reference signs are given to the parts common to the turbine housing 2, and redundant description will be omitted as appropriate.

The turbine housing 02 according to the comparative example includes a scroll passage wall surface 041 connecting the outer peripheral end 401 of the scroll passage 40 and the outer peripheral end 521 of the hub-side passage wall surface 52. The scroll passage wall surface 041 does not have a cliff portion 72, which will be described below. The scroll passage wall surface 041 has an arc shape such that a distance (radial distance) from the axis LA gradually decreases rearward in the axial direction from the outer peripheral end 401 of the scroll passage 40 to the outer peripheral end 521 of the hub-side passage wall surface 52. This arc shape is a concave curve that is recessed rearward in the axial direction. In this case, exhaust gas flowing inward in the radial direction along the scroll passage wall surface 041 flows directly into the nozzle passage 50.

Figure 5:
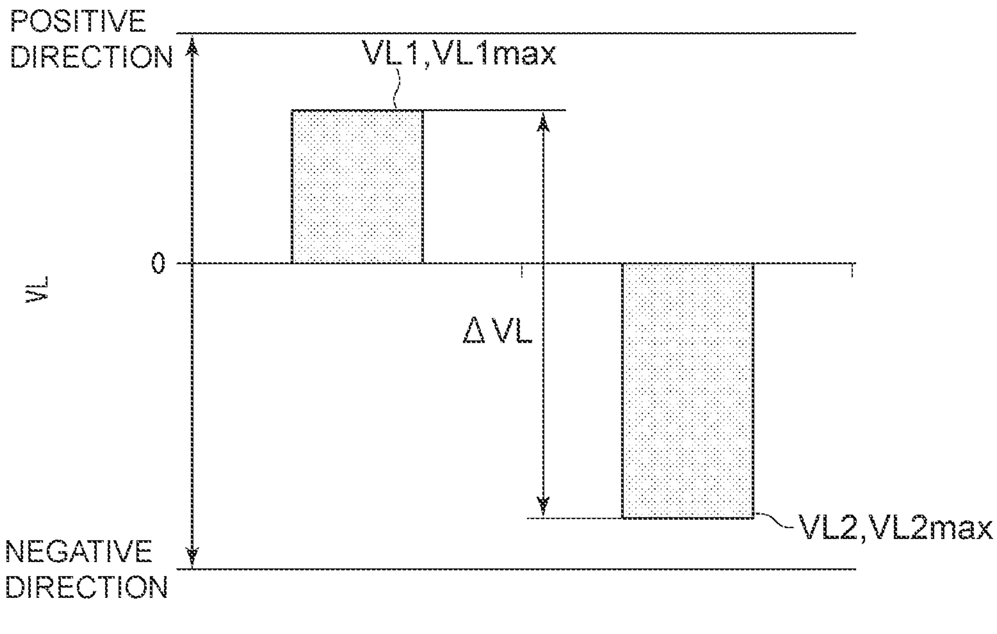
FIG. 5 is an explanatory diagram for describing load evaluation results of nozzle vanes near the tongue portion in the comparative example.

FIG. 5 is an explanatory diagram for describing load evaluation results of the nozzle vanes 61A, 61B, 61C near the tongue portion in the comparative example. CFD analysis was performed to investigate the changes in the load acting on the nozzle vane 61 under pressure conditions that simulate the conditions of pulsation from the engine 11, where the pressure ratio of exhaust gas directed to the exhaust gas introduction port 80 of the turbine housing 2 increases and decreases during one cycle of the engine 11. In the near-tongue nozzle vanes 61A, 61B, and 61C, as shown in FIG. 5, a load VL1 acting in one direction (positive direction) and a load VL2 acting in the direction opposite to the positive direction (negative direction) may occur during one cycle of the engine 11. If the direction of action of the load on the nozzle vane 61 is reversed in a short period of time, about one cycle of the engine 11, the vane shaft 64 fixed to this nozzle vane 61 frequently collides with the other member (nozzle mount 53) and the risk of wear of the vane shaft 64 increases, resulting in a reduction in reliability of the nozzle vane 61. The larger the load amplitude ΔVL, which is the sum of the absolute value of the maximum positive load VL1*max* and the absolute value of the maximum negative load VL2*max* acting on the nozzle vane 61 during one cycle of the engine 11, the higher the risk of wear of the vane shaft 64 fixed to the nozzle vane 61, and the less reliable the nozzle vane 61 is.

Figure 6:
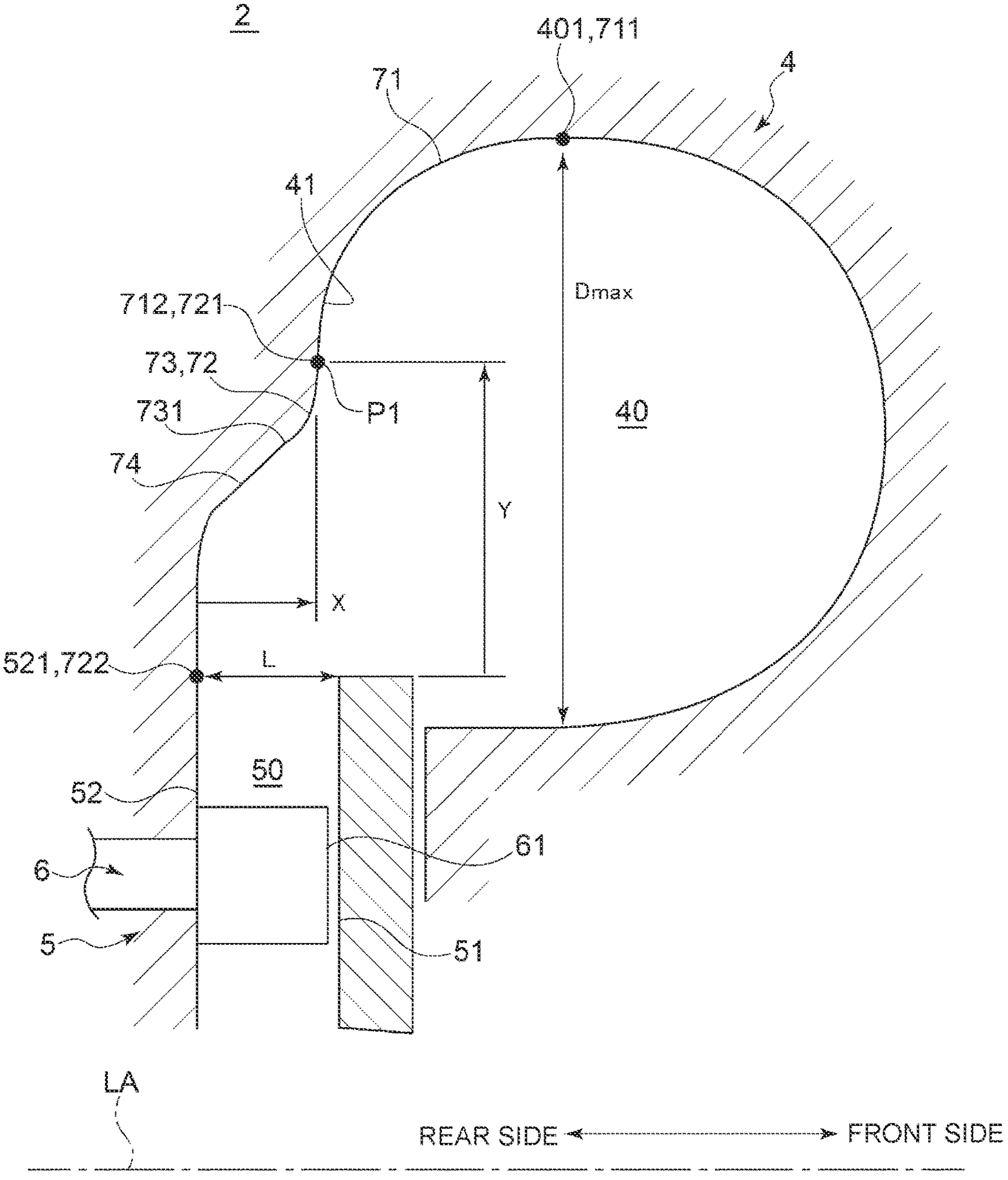
FIG. 6 is a schematic cross-sectional view of the turbine housing according to an embodiment, taken along the axis passing through the tongue portion.
Figure 7:
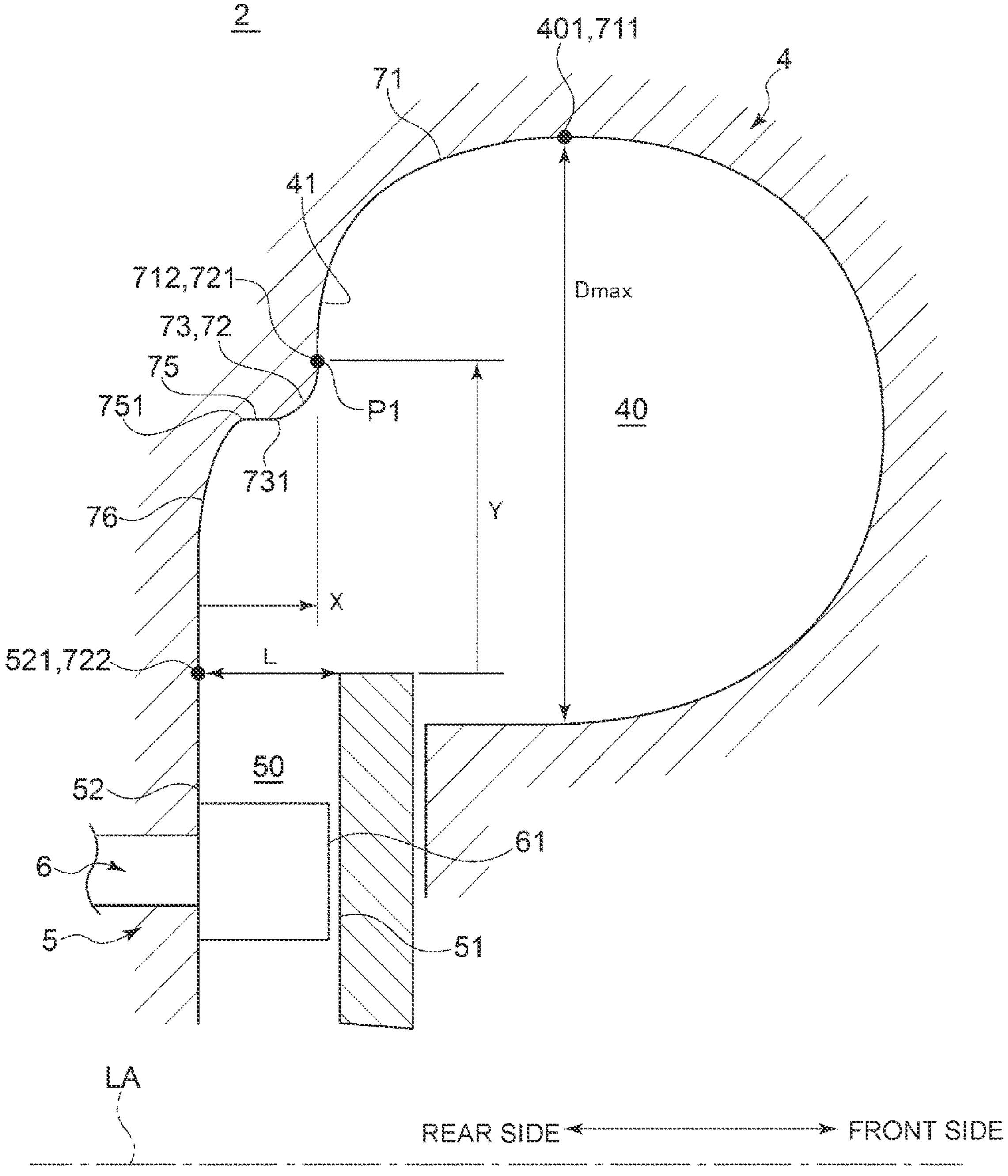
FIG. 7 is a schematic cross-sectional view of the turbine housing according to an embodiment, taken along the axis passing through the tongue portion.

FIGS. 6 and 7 are each a schematic cross-sectional view of the turbine housing 2 according to an embodiment, taken along the axis LA passing through the tongue portion. FIGS. 6 and 7 schematically show the cross-section of the turbine housing 2 in the angular position θ of 0°. As shown in FIGS. 6 and 7, the turbine housing 2 according to some embodiments includes the above-described scroll passage forming part 4, the above-described nozzle passage forming part 5, and the above-described variable nozzle unit 6. The scroll passage forming part 4 includes a scroll passage wall surface 41 connecting the outer peripheral end 401 of the scroll passage 40 and the outer peripheral end 521 of the hub-side passage wall surface 52. The outer peripheral end 521 is the outer edge of the hub-side passage wall surface 52, which defines, together with the shroud-side passage wall surface 51, the nozzle passage 50, in the radial direction of the turbine rotor 3. The scroll passage wall surface 41 includes a first arc portion 71 and a cliff portion 72 in a cross-section along the axis LA passing through the tongue portion 42 of the scroll passage forming part 4, as shown in FIGS. 6 and 7.

The first arc portion 71 is connected at its outer peripheral end 711 to the outer peripheral end 401 of the scroll passage 40, and extends from the outer peripheral end 711 inward in the radial direction of the turbine rotor 3. The first arc portion 71 has a concavely curved shape recessed rearward in the axial direction such that a distance (radial distance) from the axis LA to the first arc portion 71 gradually decreases rearward in the axial direction.

The cliff portion 72 is connected at its outer peripheral end (one end) 721 to the inner peripheral end 712 of the first arc portion 71 and at its inner peripheral end (the other end) 722 to the outer peripheral end 521 of the hub-side passage wall surface 52. The cliff portion 72 includes a second arc portion 73 connected to the inner peripheral end 712 of the first arc portion 71. The second arc portion 73 has a convexly curved shape protruding frontward in the axial direction such that a distance (radial distance) from the axis LA to the second arc portion 73 gradually decreases rearward in the axial direction. The second arc portion 73 forms an inflection point P1 between it and the first arc portion 71.

The inflection point P1 is located offset frontward from the outer peripheral end 521 of the hub-side passage wall surface 52 in the axial direction of the turbine rotor 3 and outward from the outer peripheral end 521 of the hub-side passage wall surface 52 in the radial direction of the turbine rotor 3.

As shown in FIG. 2, the cliff portion 72 is in the angular position θ of 0° so that the upstream end 723 thereof is connected to the tongue portion 42. The cliff portion 72 extends from the upstream end 723 to the downstream side of the scroll passage 40 over a predetermined circumferential range (90° or more) along the circumferential direction of the turbine rotor 3.

According to the above configuration, since the scroll passage forming part 4 is provided with the cliff portion 72, the exhaust gas with high Mach number and large swirling that flows near the tongue portion 42 of the scroll passage 40 and the wake (flow distortion) that occurs at the tongue portion with the swirl flow of exhaust gas can be prevented from flowing into the nozzle passage 50 in the vicinity of the tongue portion 42. In this case, the exhaust gas directed to the downstream side of the scroll passage 40 and having a lower Mach number than near the tongue portion 42 can be led to the nozzle passage 50, so that the fluid force from the exhaust gas acting on the nozzle vane 61 can be reduced. For example, the reversal of the direction of action of the load acting on the near-tongue nozzle vanes 61A, 61B, 61C during one cycle of the engine 11 can be suppressed, or the load amplitude ΔVL of the near-tongue nozzle vanes 61A, 61B, 61C during one cycle of the engine 11 can be reduced. By reducing the fluid force from the exhaust gas acting on the nozzle vane 61, the wear of the vane shaft 64 supporting the nozzle vane 61 can be reduced, thus improving the reliability of the nozzle vane 61.

In some embodiments, as shown in FIG. 6, the cliff portion 72 further includes an inclined portion 74 extending from the inner peripheral end 731 of the second arc portion 73 rearward in the axial direction and inward in the radial direction. The inclined portion 74 is configured such that a distance (radial distance) from the axis LA of the turbine rotor 3 to the inclined portion 74 gradually decreases rearward in the axial direction. In a cross-section along the axis LA as shown in FIG. 6, the inclined portion 74 is formed in a straight shape with a constant slope.

According to the above configuration, the cliff portion 72 including the inclined portion 74 can effectively prevent the exhaust gas with high Mach number and large swirling that flows near the tongue portion 42 of the scroll passage 40 and the wake (flow distortion) that occurs at the tongue portion 42 with the swirl flow of exhaust gas from flowing into the nozzle passage 50 in the vicinity of the tongue portion 42. In addition, the cliff portion 72 including the inclined portion 74 can suppress the formation of vortex flow of exhaust gas flowing along the cliff portion 72 (inclined portion 74) toward the nozzle passage 50, thus suppressing flow path loss in the scroll passage 40 facing the cliff portion 72.

In some embodiments, as shown in FIG. 7, the cliff portion 72 further includes an extension portion 75 extending from the inner peripheral end 731 of the second arc portion 73 along the axial direction rearward in the axial direction, and a third arc portion 76 extending from the rear end 751 of the extension portion 75 rearward in the axial direction and inward in the radial direction.

The third arc portion 76 has a concavely curved shape recessed rearward in the axial direction such that a distance (radial distance) from the axis LA to the third arc portion 76 gradually decreases rearward in the axial direction. The inner peripheral end of the third arc portion 76 is connected to the outer peripheral end 521 of the hub-side passage wall surface 52.

According to the above configuration, the cliff portion 72 including the extension portion 75 and the third arc portion 76 can effectively prevent the exhaust gas with high Mach number and large swirling that flows near the tongue portion 42 of the scroll passage 40 and the wake (flow distortion) that occurs at the tongue portion with the swirl flow of exhaust gas from flowing into the nozzle passage 50 in the vicinity of the tongue portion 42. Incidentally, the cliff portion 72 including the inclined portion 74 can suppress the formation of vortex flow of exhaust gas flowing along the cliff portion 72 toward the nozzle passage 50 more effectively than the cliff portion 72 including the extension portion 75 and the third arc portion 76.

In some embodiments, as shown in FIG. 2, when the angular position θ is defined such that, with the angular position of the tongue portion 42 in the circumferential direction of the turbine housing 2 being 0° the angle gradually increases from the tongue portion 42 toward the downstream side of the scroll passage 40, the angular position θmax of the downstream end 724 of the cliff portion 72 satisfies a condition of 120°≤θmax≤180°.

According to the above configuration, the larger the angular position θmax of the cliff portion 72, the more effective the suppression of exhaust gas inflow from the scroll passage 40 to the nozzle passage 50 can be ensured over a wide area up to the downstream side of the scroll passage 40, and the exhaust gas can be supplied over to the downstream side of the scroll passage 40. However, on the downstream side of the scroll passage 40, the inflow amount of exhaust gas from the scroll passage 40 to the nozzle passage 50 must be secured. When the angular position θmax of the cliff portion 72 satisfies a condition of 120°≤θmax≤180°, the exhaust gas can be supplied to the downstream side of the scroll passage 40, and the appropriate amount of exhaust gas can flow from the scroll passage 40 to the nozzle passage 50 on the downstream side of the scroll passage 40.

(Lengths X, Y of Cliff Portion)

As shown in FIGS. 6 and 7, the length in the axial direction between the outer peripheral end (one end) 721 and the inner peripheral end (other end) 722 of the cliff portion 72 is defined as X, and the length in the radial direction between the outer peripheral end (one end) 721 and the inner peripheral end (other end) 722 of the cliff portion 72 is defined as Y. Further, the maximum value of length X from the upstream end 723 to the downstream end 724 of the cliff portion 72 is defined as Xmax, and the maximum value of the length Y from the upstream end 723 to the downstream end 724 of the cliff portion 72 is defined as Ymax.

Figure 8:
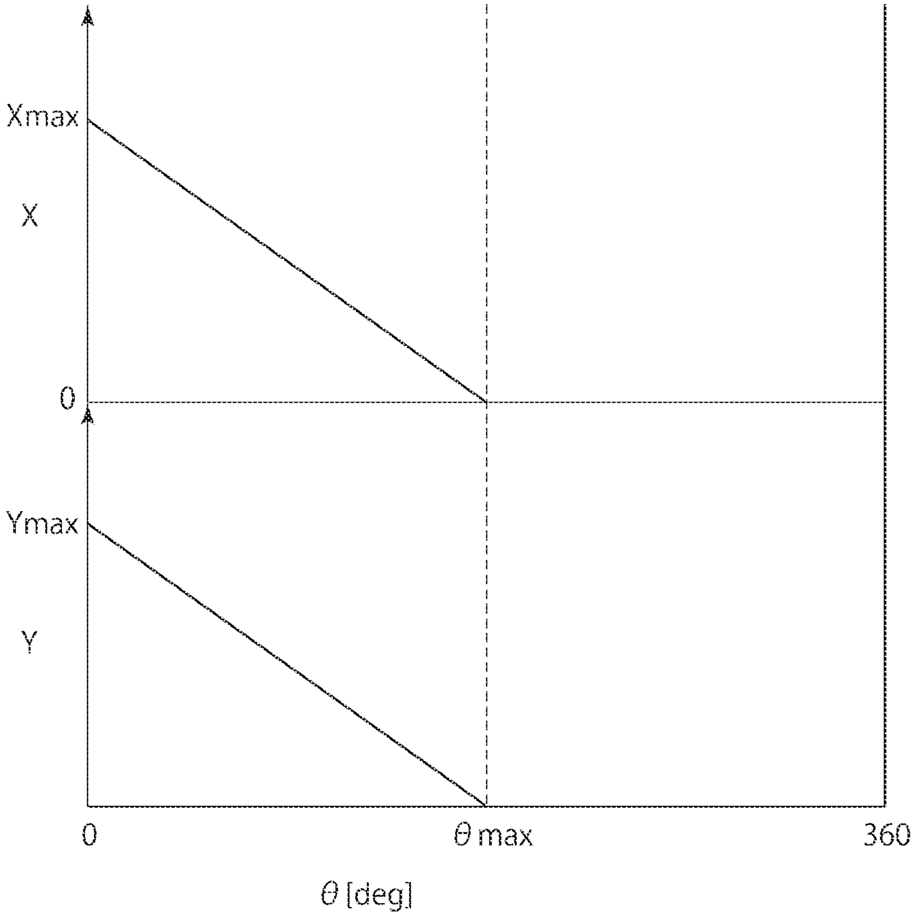
FIG. 8 is an explanatory diagram for describing the relationship between angular position θ and each of length X in the axial direction and length Y in the radial direction of the cliff portion according to an embodiment.
Figure 9:
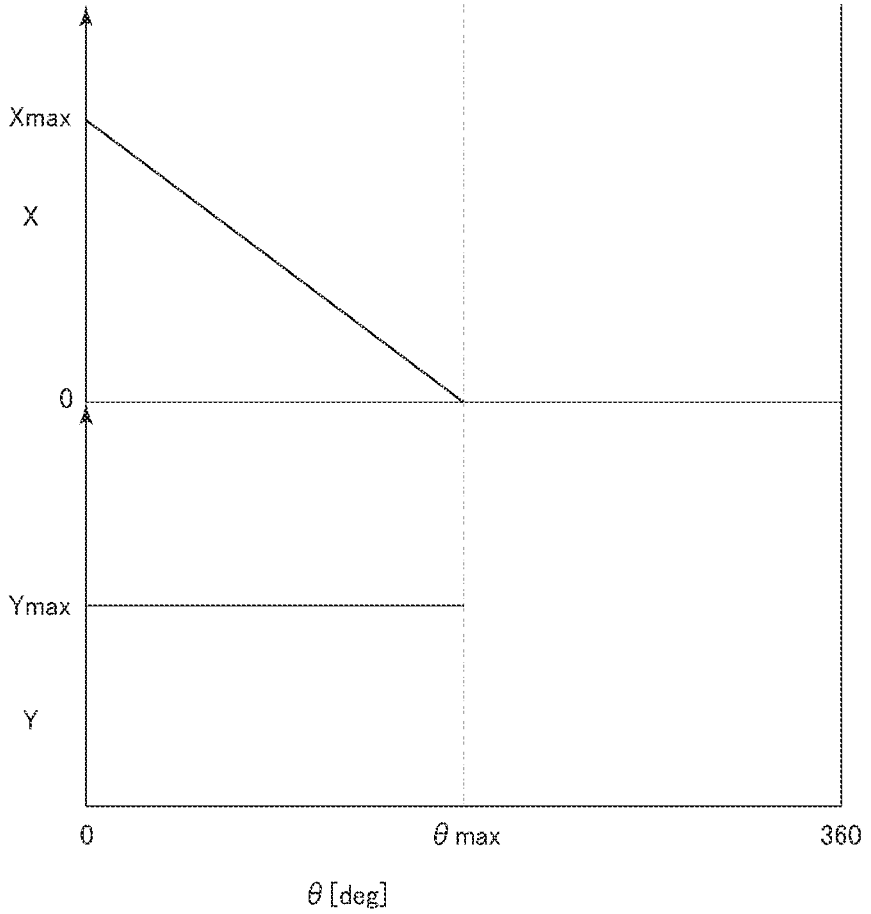
FIG. 9 is an explanatory diagram for describing the relationship between angular position θ and each of length X in the axial direction and length Y in the radial direction of the cliff portion according to an embodiment.
Figure 10:
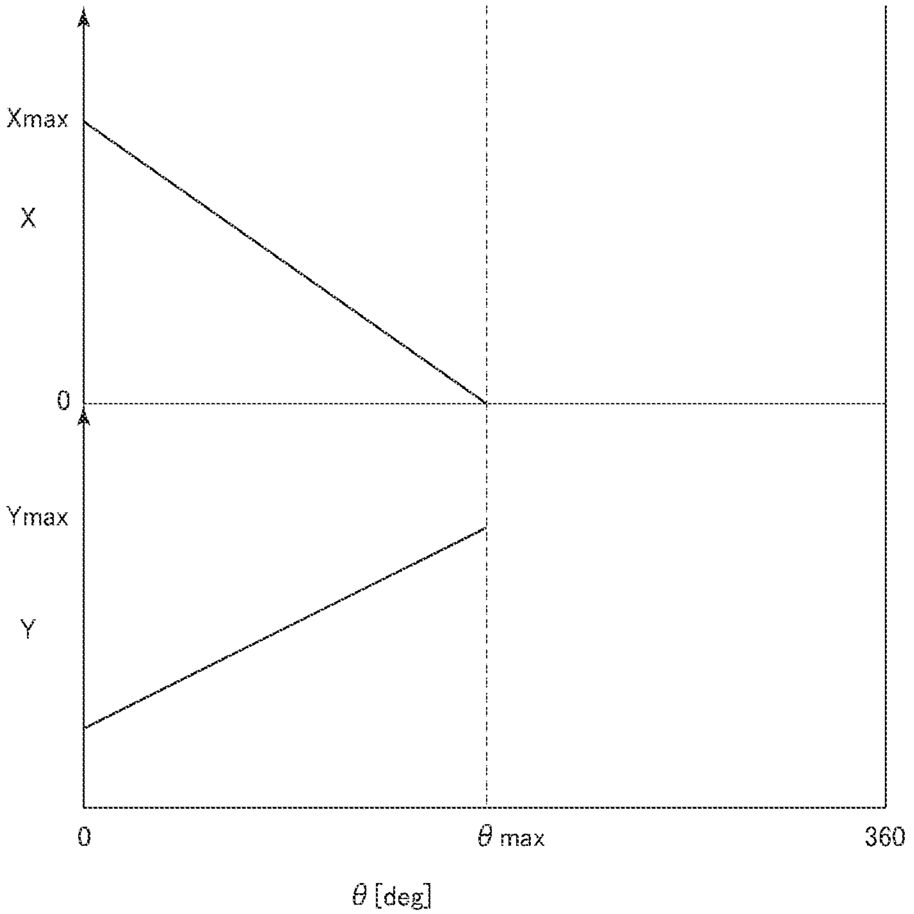
FIG. 10 is an explanatory diagram for describing the relationship between angular position θ and each of length X in the axial direction and length Y in the radial direction of the cliff portion according to an embodiment.
Figure 11:
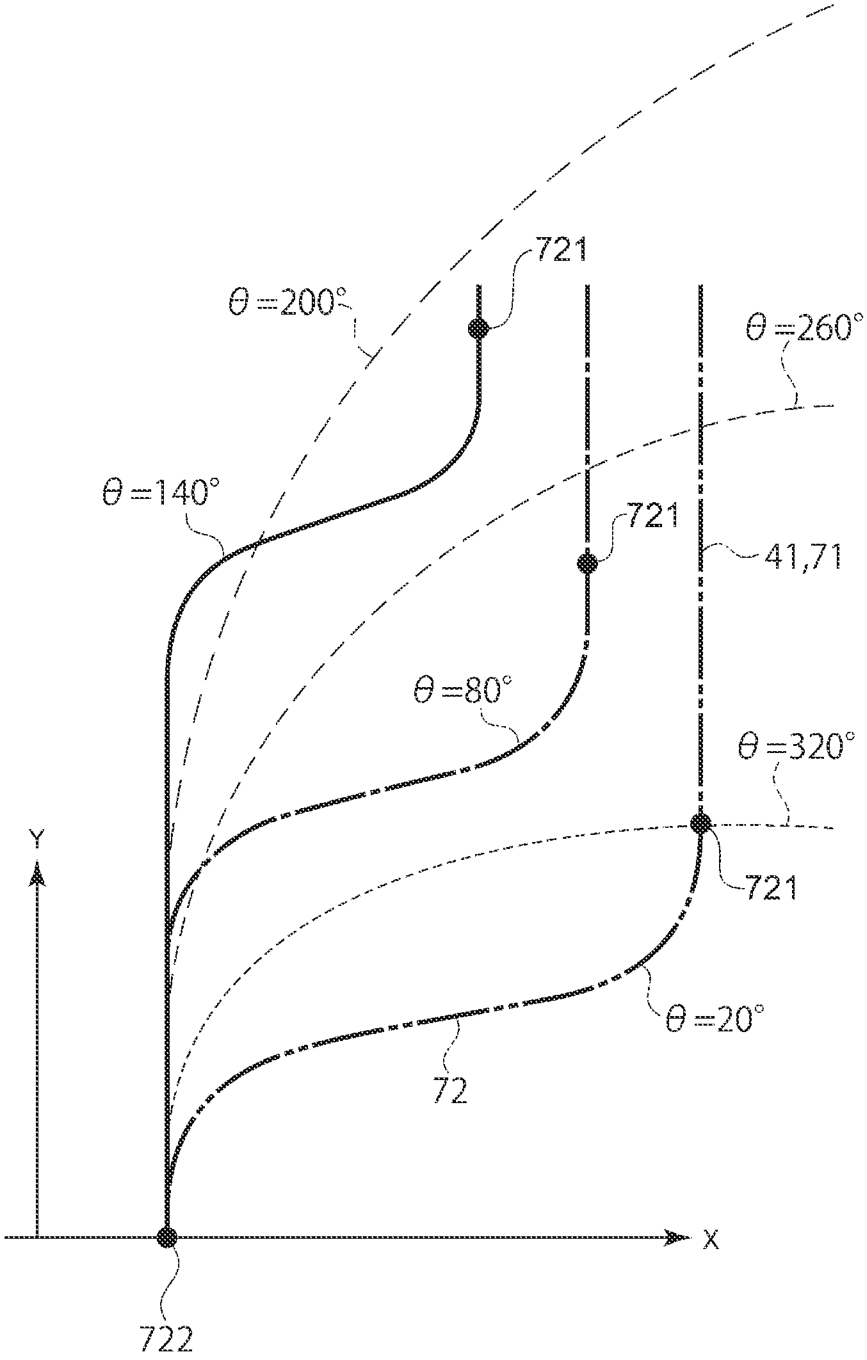
FIG. 11 is an explanatory diagram for describing the shape of the scroll passage wall surface in multiple angular positions according to an embodiment.

FIGS. 8 to 10 are each an explanatory diagram for describing the relationship between angular position θ and each of length X in the axial direction and length Y in the radial direction of the cliff portion 72 according to an embodiment. FIG. 11 is an explanatory diagram for describing the shape of the scroll passage wall surface 41 in multiple angular positions θ according to an embodiment. In some embodiments, as shown in FIGS. 8 to 10, the length X of the cliff portion 72 in the axial direction gradually decreases toward the downstream side of the scroll passage 40. The length X has the maximum value Xmax in the angular position θ of 0°, and the length X has the minimum value in the angular position θ of θmax.

FIG. 11 shows the shape of the scroll passage wall surface 41 in multiple angular positions θ including the cliff portion 72 (θ=20°, 80°, 140°) and the shape of the scroll passage wall surface 41 in multiple angular positions θ not including the cliff portion 72 (θ=200°, 260°, 320°). In the embodiment shown in FIG. 11, in the circumferential range where the cliff portion 72 is formed (0°≤θ≤θmax), the scroll passage wall surface 41 is designed such that the outer peripheral end (one end) 721 of the cliff portion 72 moves rearward in the axial direction as it moves downstream of the scroll passage 40 (the angular position θ increases). In the circumferential range where the cliff portion 72 is not formed (θmax≤θ<360°), the scroll passage wall surface 41 moves inward in the radial direction as it moves downstream of the scroll passage 40 (the angle position θ increases).

According to the above configuration, the longer the length X of the cliff portion 72, the more effective the suppression of exhaust gas inflow from the scroll passage 40 to the nozzle passage 50. With the configuration in which the length X of the cliff portion 72 gradually decreases toward the downstream side of the scroll passage 40, the appropriate amount of exhaust gas can flow from the scroll passage 40 to the nozzle passage 50 on the downstream side of the scroll passage 40 while suppressing exhaust gas inflow from the scroll passage 40 to the nozzle passage 50 on the upstream side of the scroll passage 40, such as near the tongue portion 42.

As shown in FIGS. 6 and 7, the length of the nozzle passage 50 in the axial direction at the outer peripheral end 521 of the hub-side passage wall surface 52 is defined as L. In some embodiments, the maximum value Xmax of length X of the cliff portion 72 in the axial direction satisfies a condition of 0.75×L≤Xmax≤1.25×L.

Figure 12:
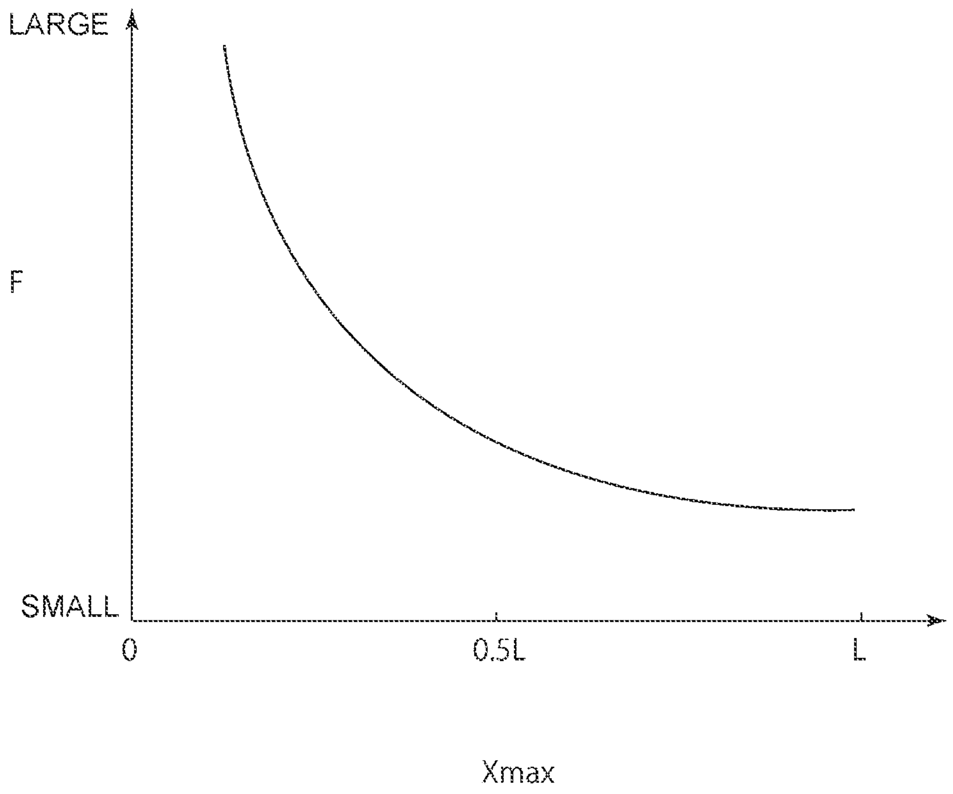
FIG. 12 is an explanatory diagram for describing the relationship between maximum value of length in the axial direction between one end and the other end of the cliff portion and inflow amount of exhaust gas from the scroll passage to the nozzle passage in a circumferential range where the cliff portion is formed according to an embodiment.

FIG. 12 is an explanatory diagram for describing the relationship between maximum value Xmax of length X in the axial direction between the outer peripheral end (one end) 721 and the inner peripheral end (other end) 722 of the cliff portion 72 and inflow amount F of exhaust gas from the scroll passage 40 to the nozzle passage 50 in the circumferential range where the cliff portion 72 is formed (0°≤θ≤θmax) according to an embodiment. As shown in FIG. 12, in the range where the maximum value Xmax is not more than the length L of the nozzle passage 50 in the axial direction, as the maximum value Xmax increases, the inflow amount F decreases while the amount of decrease in inflow amount F decreases.

According to the above configuration, if the maximum value Xmax is too small, the suppression of exhaust gas inflow from the scroll passage 40 to the nozzle passage 50 may be less effective. Further, if the maximum value Xmax is too large, the possibility of vortex flow in the scroll passage 40 facing the cliff portion 72 increases, and the flow path loss in the scroll passage 40 facing the cliff portion 72 may increase. When the maximum value Xmax of the cliff portion 72 satisfies a condition of 0.75×L≤Xmax≤1.25×L, the effect of suppression of exhaust gas inflow from the scroll passage 40 to the nozzle passage 50 can be ensured while suppressing the generation of vortex flow in the scroll passage 40 facing the cliff portion 72.

In some embodiments, as shown in FIG. 8, the length Y of the cliff portion 72 in the radial direction gradually decreases toward the downstream side of the scroll passage 40. The length Y has the maximum value Ymax in the angular position θ of 0°, and the length Y has the minimum value in the angular position θ of θmax. In the circumferential range where the cliff portion 72 is formed (0°≤θ≤θmax), the scroll passage wall surface 41 is designed such that the outer peripheral end (one end) 721 of the cliff portion 72 moves inward in the radial direction as it moves downstream of the scroll passage 40 (the angular position θ increases).

According to the above configuration, the longer the length Y of the cliff portion 72, the smaller the flow-path cross-sectional area of the scroll passage 40 (passage communicating with nozzle passage 50) facing the cliff portion 72 and located radially inward of the cliff portion 72, and thus the more effective the suppression of exhaust gas inflow from the scroll passage 40 to the nozzle passage 50. With the configuration in which the length Y of the cliff portion 72 gradually increases toward the downstream side of the scroll passage 40, the effect of suppression of exhaust gas inflow from the scroll passage 40 to the nozzle passage 50 can be ensured over a wide area up to the downstream side of the scroll passage 40.

In some embodiments, as shown in FIG. 9, the length Y of the cliff portion 72 in the radial direction is constant in a predetermined circumferential range. In the embodiment shown in FIG. 9, the length Y in the radial direction of the cliff portion 72 is constant in the circumferential range where the cliff portion 72 is formed (0°≤θ≤θmax), but the length Y may be constant in a part of the circumferential range where the cliff portion 72 is formed.

According to the above configuration, the effect of suppression of exhaust gas inflow from the scroll passage 40 to the nozzle passage 50 in the predetermined circumferential range where the length Y of the cliff portion 72 is constant is dominated by the influence of the length X of the cliff portion 72. Therefore, by adjusting the length X of the cliff portion 72, the effect of suppression of exhaust gas inflow from the scroll passage 40 to the nozzle passage 50 can be easily adjusted.

In some embodiments, as shown in FIG. 10, the length Y of the cliff portion 72 in the radial direction may gradually increase toward the downstream side of the scroll passage 40. As shown in FIG. 10, the length Y may have the minimum value in the angular position θ of 0°, and the length Y has the maximum value Ymax in the angular position θ of θmax. Further, as shown in FIG. 11, in the circumferential range where the cliff portion 72 is formed (0°≤θ≤θmax), the scroll passage wall surface 41 may be designed such that the outer peripheral end (one end) 721 of the cliff portion 72 moves outward in the radial direction as it moves downstream of the scroll passage 40 (the angular position θ increases).

As shown in FIGS. 6 and 7, the maximum length of the scroll passage 40 in the radial direction in a cross-section along the axis LA passing through the tongue portion 42 of the scroll passage forming part 4 (cross-section in angular position 0°) is defined as Dmax. In some embodiments, the maximum value Ymax of length Y of the cliff portion 72 in the radial direction satisfies a condition of 0≤Ymax≤0.7×Dmax.

According to the above configuration, if the maximum value Ymax is too small, the suppression of exhaust gas inflow from the scroll passage 40 to the nozzle passage 50 may be excessive, the possibility of vortex flow in the scroll passage 40 facing the cliff portion 72 increases, and the flow path loss in the scroll passage 40 facing the cliff portion 72 may increase. Further, if the maximum value Ymax is too large, the suppression of exhaust gas inflow from the scroll passage 40 to the nozzle passage 50 may be less effective. When the maximum value Ymax of the cliff portion 72 satisfies a condition of 0≤Ymax≤0.7×Dmax, the effect of suppression of exhaust gas inflow from the scroll passage 40 to the nozzle passage 50 can be ensured while suppressing the generation of vortex flow in the scroll passage 40 facing the cliff portion 72.

In some embodiments, as shown in FIG. 2, the turbine housing 2 has a first exhaust gas introduction port (gas introduction port) 81 for directing exhaust gas (gas) to the scroll passage 40, a second exhaust gas introduction port (gas introduction port) 82, disposed outward of the first exhaust gas introduction port 81 in the radial direction of the turbine rotor 3, for directing exhaust gas (gas) to the scroll passage 40, and a confluence passage forming part 84 which forms a confluence passage 83. The confluence passage 83 allows the exhaust gas (gas) introduced into the turbine housing 2 through the first exhaust gas introduction port 81 and the exhaust gas (gas) introduced into the turbine housing 2 through the second exhaust gas introduction port 82 to join. The confluence passage 83 communicates with the upstream end 402 of the scroll passage 40.

The exhaust gas introduced into the turbine housing 2 through the first exhaust gas introduction port 81 or the second exhaust gas introduction port 82 passes through the confluence passage 83 and then flows into the scroll passage 40. During one cycle of the engine 11, there are cases where exhaust gas is mainly directed from the first exhaust gas introduction port 81, exhaust gas is mainly directed from the second exhaust gas introduction port 82, and exhaust gas is directed from both the first exhaust gas introduction port 81 and the second exhaust gas introduction port 82.

According to the above configuration, depending on whether the exhaust gas is mainly directed from the first exhaust gas introduction port 81 or the exhaust gas is mainly directed from the second exhaust gas introduction port 82, the inflow angle of exhaust gas flowing into the scroll passage 40 changes, and the inflow angle of exhaust gas flowing into the nozzle passage 50 also changes. In the configuration such as the above, in which the exhaust gas is directed from each of the first exhaust gas introduction port 81 and the second exhaust gas introduction port 82, the fluctuation of the inflow angle of exhaust gas flowing into the nozzle passage 50 during one cycle of the engine 11 is larger, and thus the load amplitude ΔVL acting on the nozzle vane 61 is larger compared to the configuration in which the exhaust gas is directed from a single exhaust gas introduction port, increasing the risk of wear of the vane shaft 64 fixed to the nozzle vane (61. Even in this configuration, the cliff portion 72 can effectively reduce the fluid force (load amplitude ΔVL) acting on the nozzle vane 61 during one cycle of the engine 11.

In some embodiments, as shown in FIG. 2, the above-described confluence passage forming part 84 includes a contraction portion 85 configured such that the flow-path area of the confluence passage 83 gradually decreases toward the downstream side of the confluence passage 83.

In a cross-section perpendicular to the axis LA, as shown in FIG. 2, the contraction portion 85 has an inner wall surface 86 which forms the confluence passage 83, and an outer wall surface 87 which is formed father away from the axis LA than the inner wall surface 86 and forms the confluence passage 83 between it and the inner wall surface 86. The inner wall surface 86 is configured such that a distance from the axis LA to the inner wall surface 86 gradually increases toward the downstream side of the confluence passage 83. The outer wall surface 87 is configured such that a distance from the axis LA to the outer wall surface 87 gradually decreases toward the downstream side of the confluence passage 83.

According to the above configuration, since the confluence passage 83 has the contraction portion 85 with the inner wall surface 86 and the outer wall surface 87, the flow velocity and inflow angle of exhaust gas flowing from the confluence passage 83 into the scroll passage 40 can be stabilized, so that the exhaust gas can be supplied to the downstream side of the scroll passage 40 regardless of whether the exhaust gas is mainly directed from the first exhaust gas introduction port 81 or the second exhaust gas introduction port 82. As a result, the exhaust gas with high Mach number and large swirling that flows near the tongue portion 42 of the scroll passage 40 and the wake (flow distortion) that occurs at the tongue portion with the swirl flow of exhaust gas can be effectively prevented from flowing into the nozzle passage 50 in the vicinity of the tongue portion 42.

The variable geometry turbocharger 1 according to some embodiments includes, as shown in FIG. 1, the above-described turbine housing 2, and the above-described turbine rotor 3. In this case, the reliability of the turbocharger 1 can be improved by improving the reliability of the nozzle vane 61 in the turbine housing 2.

In the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

The present disclosure is not limited to the embodiments described above, but includes modifications to the embodiments described above, and embodiments composed of combinations of those embodiments.

The contents described in the above embodiments would be understood as follows, for instance.

1) A turbine housing (2) according to at least one embodiment of the invention is a turbine housing (2) for accommodating a turbine rotor (3) and includes: a scroll passage forming part (4) which forms a scroll passage (40) extending along a circumferential direction around an axis (LA) of the turbine rotor (3); a nozzle passage forming part (5) which forms a nozzle passage (50) for directing exhaust gas from the scroll passage (40) to the turbine rotor (3) disposed on an inner peripheral side of the scroll passage (40), the nozzle passage forming part (50) having a shroud-side passage wall surface (51) and a hub-side passage wall surface (52) which define the nozzle passage (50); and a variable nozzle unit (6) for adjusting a flow of the exhaust gas in the nozzle passage (50), the variable nozzle unit (6) including at least one nozzle vane (61) disposed in the nozzle passage (50). The scroll passage forming part (4) includes a scroll passage wall surface (41) connecting an outer peripheral end (401) of the scroll passage (40) and an outer peripheral end (521) of the hub-side passage wall surface (52). In a cross-section along the axis (LA) passing through a tongue portion (42) of the scroll passage forming part (4), the scroll passage wall surface (41) includes: a first arc portion (71) connected at an outer peripheral end (711) to the outer peripheral end (401) of the scroll passage (40) and extending from the outer peripheral end (711) inward in a radial direction of the turbine rotor (3); and a cliff portion (72) connected at one end (721) to an inner peripheral end (712) of the first arc portion (71) and connected at another end (722) to the outer peripheral end (521) of the hub-side passage wall surface (52), the cliff portion (72) including a second arc portion (73) connected to the inner peripheral end (712) of the first arc portion (71) and forming an inflection point (P1) between the first arc portion (71) and the second arc portion (73). The inflection point (P1) is located offset frontward from the outer peripheral end (521) of the hub-side passage wall surface (52) in an axial direction of the turbine rotor (3) and outward from the outer peripheral end (521) of the hub-side passage wall surface (52) in the radial direction.

According to the above configuration 1), since the scroll passage forming part (4) is provided with the cliff portion (72), the exhaust gas with high Mach number and large swirling that flows near the tongue portion (42) of the scroll passage (40) and the wake (flow distortion) that occurs at the tongue portion with the swirl flow of exhaust gas can be prevented from flowing into the nozzle passage (50) in the vicinity of the tongue portion (42). In this case, the exhaust gas directed to the downstream side of the scroll passage (40) and having a lower Mach number than near the tongue portion (42) can be led to the nozzle passage (50), so that the fluid force from the exhaust gas acting on the nozzle vane (61) can be reduced. By reducing the fluid force from the exhaust gas acting on the nozzle vane (61), the wear of the vane shaft (64) supporting the nozzle vane (61) can be reduced, thus improving the reliability of the nozzle vane (61).

2) In some embodiments, in the turbine housing (2) as defined in the above 1), the cliff portion (72) further includes an inclined portion (74) extending from an inner peripheral end (731) of the second arc portion (73) rearward which is opposite to frontward in the axial direction and inward in the radial direction. The inclined portion (74) is configured such that a distance from the axis (LA) of the turbine rotor (3) to the inclined portion (74) gradually decreases rearward in the axial direction.

According to the above configuration 2), the cliff portion (72) including the inclined portion (74) can effectively prevent the exhaust gas with high Mach number and large swirling that flows near the tongue portion (42) of the scroll passage (40) and the wake (flow distortion) that occurs at the tongue portion with the swirl flow of exhaust gas from flowing into the nozzle passage (50) in the vicinity of the tongue portion (42). In addition, the cliff portion (72) including the inclined portion (74) can suppress the formation of vortex flow of exhaust gas flowing along the cliff portion (72) toward the nozzle passage (50), thus suppressing flow path loss in the scroll passage (40) facing the cliff portion (72).

3) In some embodiments, in the turbine housing (2) as defined in the above 1), the cliff portion (72) further includes: an extension portion (75) extending from an inner peripheral end (731) of the second arc portion (73) along the axial direction rearward which is opposite to frontward in the axial direction; and a third arc portion (76) extending from a rear end (751) of the extension portion (75) rearward in the axial direction and inward in the radial direction.

According to the above configuration 3), the cliff portion (72) including the extension portion (75) and the third arc portion (76) can effectively prevent the exhaust gas with high Mach number and large swirling that flows near the tongue portion (42) of the scroll passage (40) and the wake (flow distortion) that occurs at the tongue portion with the swirl flow of exhaust gas from flowing into the nozzle passage (50) in the vicinity of the tongue portion (42).

4) In some embodiments, in the turbine housing (2) as defined in any one of the above 1) to 3), when a length in the axial direction between the one end (721) and the another end (722) of the cliff portion (72) is defined as X, the length X gradually decreases toward a downstream side of the scroll passage (40).

According to the above configuration 4), the longer the length X of the cliff portion (72), the more effective the suppression of exhaust gas inflow from the scroll passage (40) to the nozzle passage (50). With the configuration in which the length X of the cliff portion (72) gradually decreases toward the downstream side of the scroll passage (40), the appropriate amount of exhaust gas can flow from the scroll passage (40) to the nozzle passage (50) on the downstream side of the scroll passage (40), while suppressing exhaust gas inflow from the scroll passage (40) to the nozzle passage (50) on the upstream side of the scroll passage (40), such as near the tongue portion (42).

5) In some embodiments, in the turbine housing (2) as defined in any one of the above 1) to 4), when a length in the axial direction between the one end (721) and the another end (722) of the cliff portion (72) is defined as X, a maximum value of the length X of the cliff portion (72) is defined as Xmax, and a length of the nozzle passage (50) in the axial direction at the outer peripheral end (521) of the hub-side passage wall surface (52) is defined as L, the maximum value Xmax satisfies a condition of $0.75 \times L \leq Xmax \leq 1.25 \times L$.

According to the above configuration 5), if the maximum value Xmax is too small, the suppression of exhaust gas inflow from the scroll passage (40) to the nozzle passage (50) may be less effective. Further, if the maximum value Xmax is too large, the possibility of vortex flow in the scroll passage (40) facing the cliff portion (72) increases, and the flow path loss in the scroll passage (40) facing the cliff portion (72) may increase. When the maximum value Xmax of the cliff portion (72) satisfies a condition of $0.75 \times L \leq Xmax \leq 1.25 \times L$, the effect of suppression of exhaust gas inflow from the scroll passage (40) to the nozzle passage (50) can be ensured while suppressing the generation of vortex flow in the scroll passage (40) facing the cliff portion (72).

6) In some embodiments, in the turbine housing (2) as defined in any one of the above 1) to 5), when a length in the radial direction between the one end (721) and the another end (722) of the cliff portion (72) is defined as Y, the length Y gradually decreases toward a downstream side of the scroll passage (40).

According to the above configuration 6), the longer the length Y of the cliff portion (72), the smaller the flow-path cross-sectional area of the scroll passage (40, passage communicating with nozzle passage 50) facing the cliff portion (72) and located radially inward of the cliff portion (72), and thus the more effective the suppression of exhaust gas inflow from the scroll passage (40) to the nozzle passage (50). With the configuration in which the length Y of the cliff portion (72) gradually increases toward the downstream side of the scroll passage (40), the effect of suppression of exhaust gas inflow from the scroll passage (40) to the nozzle passage

(50) can be ensured over a wide area up to the downstream side of the scroll passage (40).

7) In some embodiments, in the turbine housing (2) as defined in any one of the above 1) to 6), when a length in the radial direction between the one end (721) and the another end (722) of the cliff portion (72) is defined as Y, the length Y is constant in a predetermined circumferential range.

According to the above configuration 7), the effect of suppression of exhaust gas inflow from the scroll passage (40) to the nozzle passage (50) in the predetermined circumferential range where the length Y of the cliff portion (72) is constant is dominated by the influence of the length X of the cliff portion (72). Therefore, by adjusting the length X of the cliff portion (72), the effect of suppression of exhaust gas inflow from the scroll passage (40) to the nozzle passage (50) can be easily adjusted.

8) In some embodiments, in the turbine housing (2) as defined in any one of the above 1) to 7), when a length in the radial direction between the one end (721) and the another end (722) of the cliff portion (72) is defined as Y, a maximum value of the length Y of the cliff portion (72) is defined as Ymax, and a maximum length of the scroll passage (40) in the radial direction in a cross-section along the axis (LA) passing through the tongue portion (42) of the scroll passage forming part (4) is defined as Dmax, the maximum value Ymax satisfies a condition of $0 \leq Ymax \leq 0.7 \times Dmax$.

According to the above configuration 8), if the maximum value Ymax is too small, the suppression of exhaust gas inflow from the scroll passage (40) to the nozzle passage (50) may be excessive, the possibility of vortex flow in the scroll passage (40) facing the cliff portion (72) increases, and the flow path loss in the scroll passage (40) facing the cliff portion (72) may increase. Further, if the maximum value Ymax is too large, the suppression of exhaust gas inflow from the scroll passage (40) to the nozzle passage (50) may be less effective. When the maximum value Ymax of the cliff portion (72) satisfies a condition of $0 \leq Ymax \leq 0.7 \times Dmax$, the effect of suppression of exhaust gas inflow from the scroll passage (40) to the nozzle passage (50) can be ensured while suppressing the generation of vortex flow in the scroll passage (40) facing the cliff portion (72).

9) In some embodiments, in the turbine housing (2) as defined in any one of the above 1) to 8), when an angular position θ is defined such that, with the angular position of the tongue portion (42) in the circumferential direction of the turbine housing (2) being 0°, the angle gradually increases from the tongue portion (42) toward a downstream side of the scroll passage (40), an angular position θmax of a downstream end (724) of the cliff portion (72) satisfies a condition of $120° \leq \theta max \leq 180°$.

According to the above configuration 9), the larger the angular position θmax of the cliff portion (72), the more effective the suppression of exhaust gas inflow from the scroll passage (40) to the nozzle passage (50) can be ensured over a wide area up to the downstream side of the scroll passage (40), and the exhaust gas can be supplied over to the downstream side of the scroll passage (40). However, on the downstream side of the scroll passage (40), the inflow amount of exhaust gas from the scroll passage (40) to the nozzle passage (50) must be secured. When the angular position θmax of the cliff portion (72) satisfies a condition of $120° \leq \theta max \leq 180°$, the exhaust gas can be supplied to the downstream side of the scroll passage (40), and the appropriate amount of exhaust gas can flow from the scroll passage (40) to the nozzle passage (50) on the downstream side of the scroll passage (40).

10) In some embodiments, the turbine housing (2) as defined in any one of the above 1) to 9) further includes: a first gas introduction port (81) for directing a gas to the scroll passage (40); a second gas introduction port (82) for directing a gas to the scroll passage (40), the second gas introduction port (82) being disposed outward of the first gas introduction port (81) in the radial direction; and a confluence passage forming part (84) which forms a confluence passage (83) where the gas directed into the turbine housing (2) through the first gas introduction port (81) and the gas directed into the turbine housing (2) through the second gas introduction port (82) joins, the confluence passage (84) communicating with an upstream end (402) of the scroll passage (40).

According to the above configuration 10), depending on whether the exhaust gas is mainly directed from the first exhaust gas introduction port (81) or the exhaust gas is mainly directed from the second exhaust gas introduction port (82), the inflow angle of exhaust gas flowing into the scroll passage (40) changes, and the inflow angle of exhaust gas flowing into the nozzle passage (50) also changes. In the configuration such as the above configuration 10), in which the exhaust gas is directed from each of the first exhaust gas introduction port (81) and the second exhaust gas introduction port (82), the fluctuation of the inflow angle of exhaust gas flowing into the nozzle passage (50) during one cycle of the engine 11 is larger, and thus the load amplitude ΔVL acting on the nozzle vane (61) is larger compared to the configuration in which the exhaust gas is directed from a single exhaust gas introduction port, increasing the risk of wear of the vane shaft (64) fixed to the nozzle vane (61). Even in the configuration 10), the cliff portion (72) can effectively reduce the fluid force (load amplitude ΔVL) acting on the nozzle vane (61) during one cycle of the engine 11.

11) In some embodiments, in the turbine housing (2) as defined in the above 10), the confluence passage forming part (84) includes a contraction portion (85) configured such that a flow-path area of the confluence passage (83) gradually decreases toward a downstream side of the confluence passage (83). In a cross-section perpendicular to the axis (LA), the contraction portions (85) includes: an inner wall surface (86) which forms the confluence passage (83), where a distance from the axis (LA) to the inner wall surface (86) gradually increases toward a downstream side of the confluence passage (83); and an outer wall surface (87) which is formed father away from the axis (LA) than the inner wall surface (86) and forms the confluence passage (83) between the outer wall surface (87) and the inner wall surface (86), where a distance from the axis (LA) to the outer wall surface (87) gradually decreases toward a downstream side of the confluence passage (83).

According to the above configuration 11), since the confluence passage (83) has the contraction portion (85) with the inner wall surface (86) and the outer wall surface (87), the flow velocity and inflow angle of exhaust gas flowing from the confluence passage (83) into the scroll passage (40) can be stabilized, so that the exhaust gas can be supplied to the downstream side of the scroll passage (40) regardless of whether the exhaust gas is mainly directed from the first exhaust gas introduction port (81) or the second exhaust gas introduction port (82). As a result, the exhaust gas with high Mach number and large swirling that flows near the tongue portion (42) of the scroll passage (40) and the wake (flow distortion) that occurs at the tongue portion with the swirl flow of exhaust gas can be effectively prevented from flowing into the nozzle passage (50) in the vicinity of the tongue portion (42).

12) A variable geometry turbocharger (1) according to at least one embodiment of the present disclosure includes: the turbine housing (2) as defined in any one of the above 1) to 11); and a turbine rotor (3) rotatably accommodated in the turbine housing.

According to the above configuration 12), the reliability of the turbocharger (1) can be improved by improving the reliability of the nozzle vane (61) in the turbine housing (2).

REFERENCE SIGNS LIST

1 Turbocharger
2 Turbine housing
3 Turbine rotor
4 Scroll passage forming part
5 Nozzle passage forming part
6 Variable nozzle unit
10 Internal combustion engine system
11 Engine
12, 12A, 12B, 12C, 12D Cylinder
13, 13A, 13B, 13C, 13D Exhaust gas line
13E, 13F Confluence line
14 Gas line
15 Turbine
16 Centrifugal compressor
17 Rotational shaft
18 Bearing
20 Scroll passage
41 Scroll passage wall surface
42 Tongue portion
50 Nozzle passage
51 Shroud-side passage wall surface
52 Hub-side passage wall surface
53 Nozzle mount
54 Nozzle plate
55 Nozzle support
56 First annular plate portion
57 Second annular plate portion
58 Cylindrical portion
59 Shroud surface
61 Nozzle vane
61A, 61B, 61C Near-tongue nozzle vane
62 Rotation mechanism part
63 Drive ring
64 Vane shaft
65 Lever plate
66 Actuator
67 Controller
71 First arc portion
72 Cliff portion
73 Second arc portion
74 Inclined portion
75 Extension portion
76 Third arc portion
80 Exhaust gas introduction port
81 First exhaust gas introduction port
82 Second exhaust gas introduction port
83 Confluence passage
84 Confluence passage forming part
85 Contraction portion
86 Inner wall surface
87 Outer wall surface
161 Compressor housing
162 Impeller
163 Gas discharge port
F Inflow amount
LA Axis
P1 Inflection point
VL1*max*, VL2*max* Maximum load
VL1, VL2 Load
Xmax, Ymax Maximum value

The invention claimed is:

1. A turbine housing for accommodating a turbine rotor, comprising:

a scroll passage forming part which forms a scroll passage extending along a circumferential direction around an axis of the turbine rotor;

a nozzle passage forming part which forms a nozzle passage for directing exhaust gas from the scroll passage to the turbine rotor disposed on an inner peripheral side of the scroll passage, the nozzle passage forming part having a shroud-side passage wall surface and a hub-side passage wall surface which define the nozzle passage; and a variable nozzle unit for adjusting a flow of the exhaust gas in the nozzle passage, the variable nozzle unit including at least one nozzle vane disposed in the nozzle passage, wherein the scroll passage forming part includes a scroll passage wall surface connecting an outer peripheral end of the scroll passage and an outer peripheral end of the hub-side passage wall surface, wherein, in a cross-section along the axis passing through a tongue portion of the scroll passage forming part, the scroll passage wall surface includes:

a first arc portion connected at an outer peripheral end to the outer peripheral end of the scroll passage and extending from the outer peripheral end inward in a radial direction of the turbine rotor; and a cliff portion connected at one end to an inner peripheral end of the first arc portion and connected at another end to the outer peripheral end of the hub-side passage wall surface, the cliff portion including a second arc portion connected to the inner peripheral end of the first arc portion and forming an inflection point between the first arc portion and the second arc portion, wherein the inflection point is located offset frontward from the outer peripheral end of the hub-side passage wall surface in an axial direction of the turbine rotor and outward from the outer peripheral end of the hub-side passage wall surface in the radial direction, and wherein, when a length in the axial direction between the one end and the another end of the cliff portion is defined as X, the length X gradually decreases toward a downstream side of the scroll passage.

2. The turbine housing according to claim 1, wherein the cliff portion further includes an inclined portion extending from an inner peripheral end of the second arc portion rearward which is opposite to frontward in the axial direction and inward in the radial direction, the inclined portion being configured such that a distance from the axis of the turbine rotor to the inclined portion gradually decreases rearward in the axial direction.

3. The turbine housing according to claim 1, wherein the cliff portion further includes:

an extension portion extending from an inner peripheral end of the second arc portion along the axial direction rearward which is opposite to frontward in the axial direction; and a third arc portion extending from a rear end of the extension portion rearward in the axial direction and inward in the radial direction.

4. The turbine housing according to claim 1, wherein, when a length in the axial direction between the one end and the another end of the cliff portion is defined as X, a maximum value of the length X of the cliff portion is defined as Xmax, and a length of the nozzle passage in the axial direction at the outer peripheral end of the hub-side passage wall surface is defined as L, the maximum value Xmax satisfies a condition of $0.75\times L \leq Xmax \leq 1.25\times L$.

5. The turbine housing according to claim 1, wherein, when a length in the radial direction between the one end and the another end of the cliff portion is defined as Y, the length Y gradually decreases toward a downstream side of the scroll passage.

6. The turbine housing according to claim 1, wherein, when a length in the radial direction between the one end and the another end of the cliff portion is defined as Y, the length Y is constant in a predetermined circumferential range.

7. The turbine housing according to claim 1, wherein, when a length in the radial direction between the one end and the another end of the cliff portion is defined as Y, a maximum value of the length Y of the cliff portion is defined as Ymax, and a maximum length of the scroll passage in the radial direction in a cross-section along the axis passing through the tongue portion of the scroll passage forming part is defined as Dmax, the maximum value Ymax satisfies a condition of $0 \leq Ymax \leq 0.7\times Dmax$.

8. The turbine housing according to claim 1, wherein, when an angular position θ is defined such that, with the angular position of the tongue portion in the circumferential direction of the turbine housing being 0°, the angle gradually increases from the tongue portion toward a downstream side of the scroll passage, an angular position θmax of a downstream end of the cliff portion satisfies a condition of $120° \leq \theta max \leq 180°$.

9. The turbine housing according to claim 1, further comprising:

a first gas introduction port for directing a gas to the scroll passage;

a second gas introduction port for directing a gas to the scroll passage, the second gas introduction port being disposed outward of the first gas introduction port in the radial direction; and a confluence passage forming part which forms a confluence passage where the gas directed into the turbine housing through the first gas introduction port and the gas directed into the turbine housing through the second gas introduction port joins, the confluence passage communicating with an upstream end of the scroll passage.

10. The turbine housing according to claim 9, wherein the confluence passage forming part includes a contraction portion configured such that a flow-path area of the confluence passage gradually decreases toward a downstream side of the confluence passage, wherein, in a cross-section perpendicular to the axis, the contraction portions includes:

an inner wall surface which forms the confluence passage, where a distance from the axis to the inner wall surface gradually increases toward a downstream side of the confluence passage; and an outer wall surface which is formed father away from the axis than the inner wall surface and forms the confluence passage between the outer wall surface and the inner wall surface, where a distance from the axis to the outer wall surface gradually decreases toward a downstream side of the confluence passage.

11. A variable geometry turbocharger, comprising:

the turbine housing according to claim 1; and a turbine rotor rotatably accommodated in the turbine housing.

* * * * *